United States Patent
Minami et al.

(10) Patent No.: US 8,271,145 B2
(45) Date of Patent: Sep. 18, 2012

(54) HANDY TERMINAL FOR WIND TURBINE GENERATOR AND WIND TURBINE GENERATOR

(75) Inventors: Tohru Minami, Tokyo (JP); Eiji Irie, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 119 days.

(21) Appl. No.: 12/674,758

(22) PCT Filed: Feb. 16, 2010

(86) PCT No.: PCT/JP2010/052291
§ 371 (c)(1),
(2), (4) Date: May 18, 2010

(87) PCT Pub. No.: WO2011/101957
PCT Pub. Date: Aug. 25, 2011

(65) Prior Publication Data
US 2011/0198854 A1    Aug. 18, 2011

(51) Int. Cl.
*G05D 9/00* (2006.01)
*G05D 11/00* (2006.01)

(52) U.S. Cl. .................................................. 700/287

(58) Field of Classification Search .............. 290/44, 290/55; 700/286, 287, 290; 702/113
See application file for complete search history.

(56) References Cited

U.S. PATENT DOCUMENTS

| | | | |
|---|---|---|---|
| 2009/0224543 A1* | 9/2009 | Steudel et al. | 290/44 |
| 2009/0259429 A1* | 10/2009 | Elisiussen | 702/113 |
| 2009/0281675 A1* | 11/2009 | Rasmussen et al. | 700/287 |
| 2010/0140949 A1* | 6/2010 | Pitre et al. | 290/55 |
| 2011/0204631 A1* | 8/2011 | Minami et al. | 290/44 |
| 2011/0298213 A1* | 12/2011 | Minami et al. | 290/44 |

FOREIGN PATENT DOCUMENTS

| | | |
|---|---|---|
| JP | 4-47168 U | 4/1992 |
| JP | 2003-242231 A | 8/2003 |
| JP | 2007303420 A | 11/2007 |
| JP | 2009137746 A | 6/2009 |
| JP | 2009-287453 A | 12/2009 |
| JP | 2009544880 A | 12/2009 |

OTHER PUBLICATIONS

Decision to grant a patent for JP2010-507753, dated Apr. 27, 2012.

* cited by examiner

*Primary Examiner* — Julio Gonzalez
(74) *Attorney, Agent, or Firm* — Kanesaka, Berner & Partners, LLP (57) ABSTRACT

A handy terminal for a wind turbine generator, includes a connecting portion connectable to a connector provided in the wind turbine generator, an operating ends group including an operating button to generate an operating signal which selectively validates a control logic within a control circuit provided in the wind turbine generator, and a display portion for displaying the operating state of the operating ends group. The operating ends group includes a mode selecting button for selectively validates one of a maintenance mode and an operating mode of the wind turbine generator; and a rotor turning button for switching to the blades pitch control state in which blades of the wind turbine generator side are driven in the predetermined low speed with adjusting the pitch angle of the blades according to the rotational speed.

9 Claims, 6 Drawing Sheets

HANDY TERMINAL FOR WIND TURBINE GENERATOR AND WIND TURBINE GENERATOR

RELATED APPLICATIONS

The present application is a National Phase of International Application Number PCT/JP2010/052291, filed Feb. 16, 2010, the disclosure of which is hereby incorporated by reference herein in its entirety.

BACKGROUND OF THE INVENTION

1. Field of the Invention

The present invention relates to a handy terminal for selectively switching an operation mode and a maintenance mode of a wind turbine generator so that each operation predetermined in each mode for a wind turbine generator is performed, respectively, and a wind turbine generator including the handy terminal. In particular, the invention relates to a handy terminal for a wind turbine generator including a tower provided to stand on the ground or on the water, a nacelle supported on the tower to be controlled to rotate in the yaw direction, and a plurality of rotatable blades to be controlled to move their pitch, and a wind turbine generator including the handy terminal. The handy terminal is connectable to the connectors respectively provided on the lower portion of the tower and the nacelle so as to output operating signals for the operation or maintenance of the wind turbine generator.

2. Description of the Related Art

In recent years, the use of a wind turbine generator to generate renewable energy has become popular in view of environmental preservation.

A large size wind turbine generator often adopts the so-called a nacelle type wind turbine generator comprising a rotor head equipped with blades, a nacelle accommodating a drive train and a generator, and a tower supporting the nacelle. The drive train is for transmitting a torque from the rotor head side to the generator side, and usually includes a speed increasing gear so that rotational speed of the rotor head is increased to transmit to the generator. In order to achieve the effective utilization of the wind energy and the stable supply for the commercial line, the wind farm is composed of a plurality of the nacelle type wind turbine generator within a predetermined area. For example, a prior art for maintenance of a plurality of the wind farm is discloses in Japanese Unexamined Patent Application Publication No. 2009-287453 (Patent Publication 1).

In the maintenance of the wind turbine generator, there is a case in which the rotational shaft (and the rotor head coupled to the rotational shaft) is required to rotate.

For example, when greasing the main shaft bearing of the wind turbine generator, it is required to perform such greasing with rotating the rotational shaft slowly in order to supply grease uniformly on the whole bearing. When detaching or attaching the blades, it is required to rotate the rotor head to a position in which the blade to be detached or attached are in the horizontal direction. In the maintenance of some types of wind turbine generator, the rotational shaft is locked by a lock pin to prohibit the rotational shaft from rotating in view of the safety. In such case, it is required to rotate the rotational shaft to a position in which the lock pin can be inserted the hole of the rotational shaft.

One simple and easy manner for rotating the rotational shaft of the wind turbine in such case could be to rotate a brake disk attached to the rotational shaft in the subsequent portion of the speed increasing gear by hand, or to rotate by manually changing the pitch angle of the blades to rotate the rotational shaft utilizing the wind turbine.

PRIOR ART

[Patent Publication 1] Japanese Unexamined Patent Application Publication No. 2009-287453

SUMMARY OF THE INVENTION

It was difficult to rotate the rotational shaft to a predetermined position accurately in such manner. In addition, a manner for making the work safer is required.

In the conventional apparatus, since the maintenance operation of the wind turbine generator by the control device and the rotating operation are separate from each other, it is required to separately perform each of the operations and therefore the working efficiency was not enough. The art shown in the Patent Publication 1 is taking information related to the operating state of the wind turbine generators in each wind farm via a network being able to communicate with each wind turbine generator, but the art is not separately controlling each wind generator in the wind farm.

Accordingly, the present invention was made to solve the above problems, by providing a handy terminal for a wind turbine generator and a wind turbine generator including the handy terminal, being able to improve the safety and the work efficiency in a maintenance work such as greasing work with rotating a rotational shaft.

The present invention provides a handy terminal for a wind turbine generator, comprising a connecting portion connectable to a connector provided in the wind turbine generator, an operating ends group including an operating end to generate an operating signal which selectively validates a control logic within a control circuit provided in the wind turbine generator, and a display portion for displaying the operating state of the operating ends group, wherein the operating ends group includes a mode selecting button for selectively validating one of a maintenance mode and an operating mode; and a rotor turning button for switching to the blades pitch control state (hereinafter referred to as "rotor turning state") in which blades of the wind turbine generator side are driven in the predetermined low speed with adjusting the pitch angle of the blades according to the rotational speed.

According to the present invention, the operating ends group includes the rotor turning button for switching to the rotor turning state to rotate the blades of the wind turbine generator side in the predetermined low speed, and thereby the blades (namely, the rotational shaft) can be operated to rotate in the predetermined low speed by the handy terminal. Thus, the efficiency of the maintenance work such as greasing can be improved.

Preferably, the operating ends group is composed of a touch panel displayed on the display portion, the handy terminal includes a panel control unit for displaying an aimed operating button on the touch panel, and the rotor turning button is displayed on the touch panel by the panel control unit when the maintenance mode is selected by the mode selecting button.

In such arrangement, the panel control unit displays the aimed operating button on the touch panel, thereby the display for selecting button and the operating switch are displayed in the same screen so as to enable the visually easy operation. Further, the rotor turning button is displayed on the touch panel by the panel control unit when the maintenance mode is selected by the mode selecting button, and therefore the wind turbine generator is prohibited to be changed to the rotor turning state when the maintenance mode is not selected. Thus, the safety in the maintenance work can be improved.

Preferably, in the wind turbine generator including a nacelle supported on the a tower provided to stand on the ground or on the water, and a plurality of blades rotatably supported to the nacelle, the connecting portion is connectable to the connectors respectively provided on the lower portion of the tower and the nacelle, and wherein the handy terminal comprises an operating button control unit for controlling the display of the operating button for generating the operating signal on the touch panel or controlling validity/invalidity of operation by the operating button.

In such arrangement, the connecting portion is connectable to any of the connectors respectively provided on the lower portion of the tower and the nacelle, thereby the operator can select the connector according to his work, and therefore the efficiency of the work can be improved. Further, the handy terminal comprises an operating button control unit for controlling the display of the operating button for generating the operating signal on the touch panel or controlling validity/invalidity of operation by the operating button, and thereby it is possible to display the operation button according to a kind of the work or to control validating/invalidating of the operating button. Thus, the operational performance of the handy terminal can be improved.

Preferably, the operating button control unit displays an operating right selecting button for selecting one of a control circuit connected to the connector of the nacelle side and a circuit connected to the connector of the tower side, and the ON operation of the rotor turning button is validated when the connecting portion of the handy terminal is connected to the control circuit granted the operating right by the operation of the operating right selecting button, and the ON operation of the rotor turning button is invalidated when the connecting portion of the handy terminal is connected to the control circuit not granted the operating right by the operation of the operating right selecting button.

In such arrangement, the ON operation of the rotor turning button is validated only in the control circuit of which the operating right is selected, and is invalidated in the control circuit of which the operating right is not selected. Therefore, it is possible to prevent the unstable performance of the control for the maintenance work caused by the mixed operating signals sent from two control circuits or the deterioration of the safety of the maintenance work.

Preferably, the operating button control unit does not permit operation of any button other than the rotor turning button after the rotor turning button is turned ON. Thereby, the other operations are prohibited to be performed during performing of the rotor turning so that the safety of the maintenance work can be improved.

In another aspect, the present invention provides a wind turbine generator including a nacelle supported on a tower provided to stand on the ground or on the water, and a plurality of blades rotatably supported to the nacelle, comprising: a connector provided on the nacelle or the lower portion of the tower and connectable to the handy terminal as set forth in claim 1; a control circuit for switching to a maintenance mode to place the blades in feathering state (stopping of the rotation) when receiving the maintenance mode selecting signal from the mode selecting button of the handy terminal, and switching to the rotor turning state for rotor turning the blades based on the On operating signal of the rotor turning button in the state of the maintenance mode.

In such arrangement, the control circuit of the wind turbine generator includes a control logic for switching to a maintenance mode to place the blades in feathering state and the rotor turning state for rotor turning the blades, and these states are switched based on the ON operating signal of the rotor turning button from the handy terminal, and therefore it is possible to easily change the state of the blades from the handy terminal according to the maintenance work. Thus, the efficiency of the work can be improved.

Preferably, the control circuit validates the ON operating signal of the rotor turning button, when the connecting portion is connected to the connector provided in the nacelle side.

In such an arrangement, it is possible to prevent the unstable performance of the control for the maintenance work caused by the mixed operating signals sent from two control circuits. In general, when the blades is switched to the rotor turning state for greasing to the main shaft, preparing of detaching or attaching of the blades, or inserting the lock pin, such work is performed nearby the nacelle. Thus, the efficiency of the work and the safety of work can be improved by validating the ON operating signal of the rotor turning button when the connecting portion is connected to the connector provided in the nacelle side.

Preferably, the control circuit does not permit operation of any button other than the rotor turning button after validating the ON operating signal of the rotor turning button. In such arrangement, any other operation is not performed in the rotor turning state, and therefore the safety of the work can be improved.

Preferably, the control circuit keeps only the yaw control state of the nacelle and resets the other maintenance control mode when receiving an operation signal for switching to the maintenance mode from the handy terminal or an external remote control terminal.

In such arrangement, when receiving such operating signal, the other maintenance control mode is reset, and therefore it is possible to normally operate the wind turbine generator after the operation mode was switched.

According to the present invention, as mentioned above, the operating ends group includes the rotor turning button for switching to the rotor turning state to rotate the blades of the wind turbine generator side in the predetermined low speed, and thereby the blades (namely, the rotational shaft) can be operated to rotate in the predetermined low speed by the handy terminal. Thus, the efficiency of the maintenance work such as greasing can be improved.

Further, the control circuit of the wind turbine generator includes a control logic for switching to a maintenance mode to place the blades in feathering state and the rotor turning state for rotor turning the blades, and these states are switched based on the ON operating signal of the rotor turning button from the handy terminal, and thereby it is possible to easily change the state of the blades from the handy terminal according to the maintenance work. Thus, the efficiency of the work can be improved.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
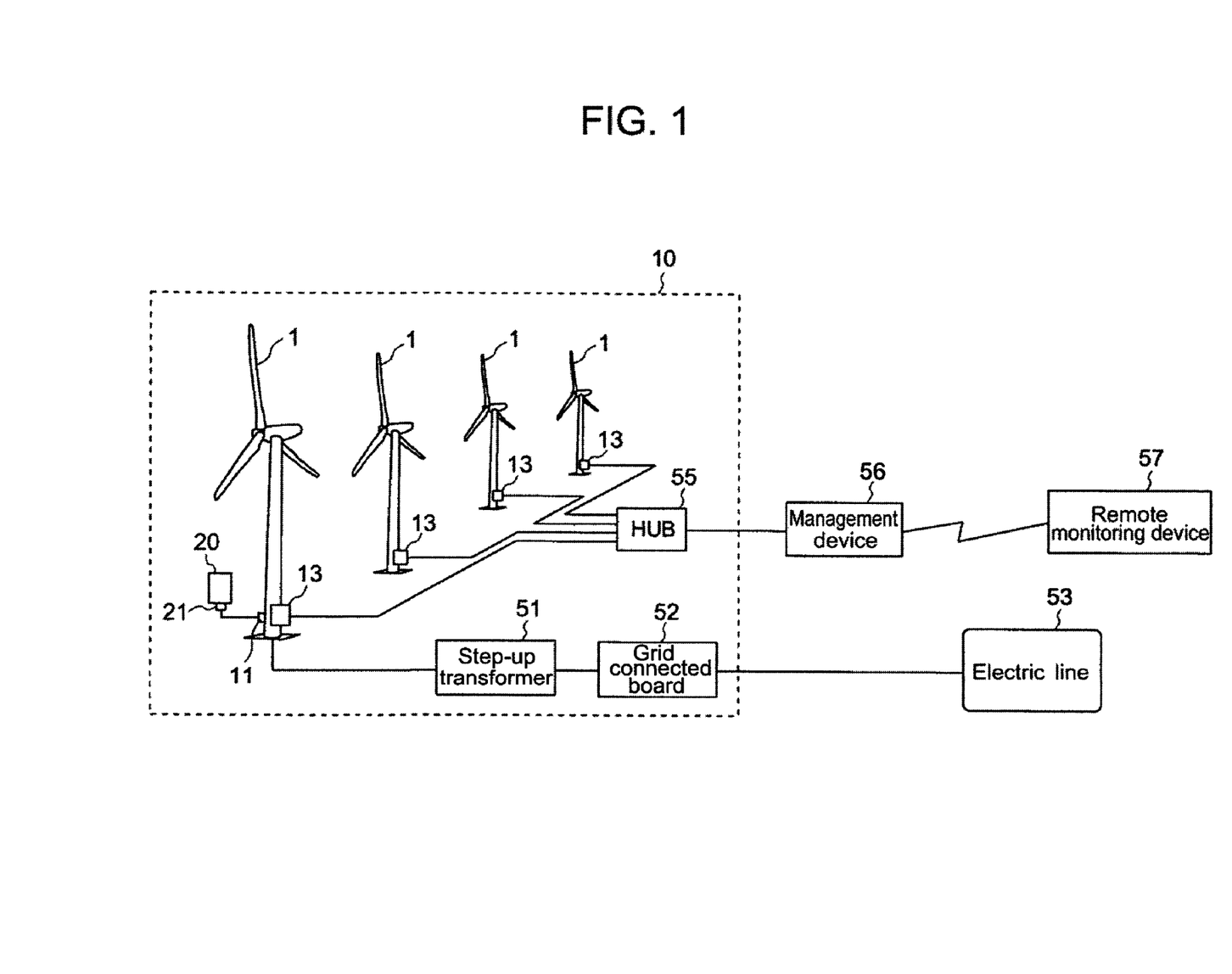
FIG. 1 is a schematic diagram showing a wind turbine generator site according to an embodiment of the present invention.

Referring first to FIG. 1, the skeleton of a wind turbine generator site including a plurality of wind turbine generators will be described.

A wind turbine generator site 10 includes a plurality of wind turbine generators 1, whereby these wind turbine generators 1 generates electricity utilizing wind power as energy. The electricity generated by the wind turbine generators 1 is supplied to an electric line 53 through a step-up transformer 51 and a grid connected board 52.

The wind turbine generators 1 are equipped with at least one control circuit 13, respectively. The control circuit 13 includes a control logic to perform a driving operation or a maintenance operation of the other wind turbine generator 1. Preferably, the control logic included in the control circuit 13 is a control logic common to the other wind turbine generator. The control circuit 13 is connected to a connector 11 so as to a variety of operating signals can be input to the control circuit from a handy terminal 20.

The wind turbine generator site 10 may includes a communications management system as described below:

The communications management system is for remote controlling and monitoring the wind turbine generators 1, and includes a management device 56 provided in the spot of the site 10, and a remote monitoring device 57 connected to the management device 56 via a communication line. The management device 56 is connected to a hub 55 via a communication cable while a plurality of control lines extended from the control circuits 13 are connected to the hub 55. Each of the management device 56 and the remote monitoring device 57 comprises a computer including CPU, ROM, RAM, memory and a communication interface, etc., and mainly monitors the operating condition of the wind turbine generators 1.

Figure 2:
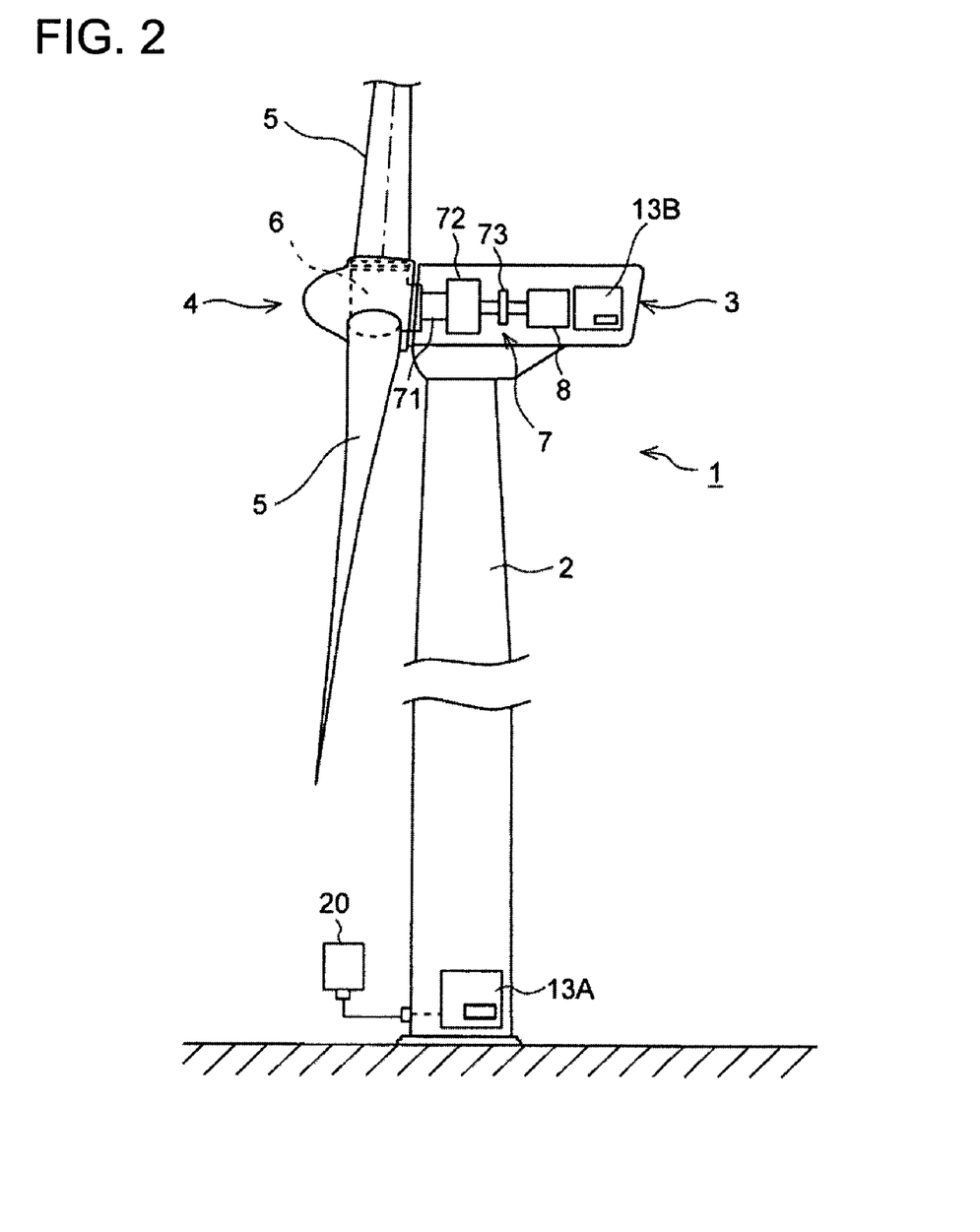
FIG. 2 is a diagram showing an example of the construction of the wind turbine generator.

Here, the specific construction of the wind turbine generator 1. FIG. 2 is a diagram showing an example of the construction of the wind turbine generator.

A wind power generator 1 mainly includes a tower 2 provided to stand on the foundation set on the ground or on the water, a nacelle 3 provided on the upper end of the tower 2, a rotor head 4 provided on the nacelle 3, a plurality of blades 5 attached to the rotor head 6, and a pitch driving device for driving the blades 5 in the pitching direction.

The tower 2 has a column-like shape extending upwardly from the foundation. The tower 2, for example, can be made from a single column-like member or made from a plurality of units aligned in upright direction and coupled each other. If the tower 2 is made from the plurality of units, the nacelle 3 is provided on the unit located on the top of the tower 2.

The nacelle 3 supports the rotor head 4 and accommodates a drive train 10 and a generator 18, etc.

The drive train 7 includes a main shaft 71 connected to the rotor head 4, a speed increasing gear 72 coupled to the main shaft 71, and a coupling 73 for connecting the speed increasing gear 72 to a generator 8.

The main shaft 71 is connected the rotor head 4 so that the main shaft 71 can be rotated with the blades 5 and the rotor head 4, while the main shaft 71 is rotatably supported to the casing side of the nacelle 3 by a main shaft bearing.

The speed increasing gear 72 is provided between the main shaft 71 and the coupling 73, and increases the rotational speed input from the main shaft 71 then outputs to the coupling 73. The speed increasing gear 72 is not limited a special type of mechanism, but, for example, can be composed by combination of a planetary gear type mechanism and a spur gear type mechanism (both of them are not shown).

The pitch driving device 6 rotates the blades 5 around its axis (a dashed line in the drawing) so as to change the pitch angle of the blades 5.

The wind turbine generator 1 is further equipped with a control circuit 13 (13A, 13B) for controlling system of the wind turbine generator 1.

The control circuit 13 includes the tower side control circuit 13A provided in the tower 2 and the nacelle side control circuit 13B accommodated within the nacelle 3. Both control circuits 13A and 13B are electrically connected to each other.

Figure 3:
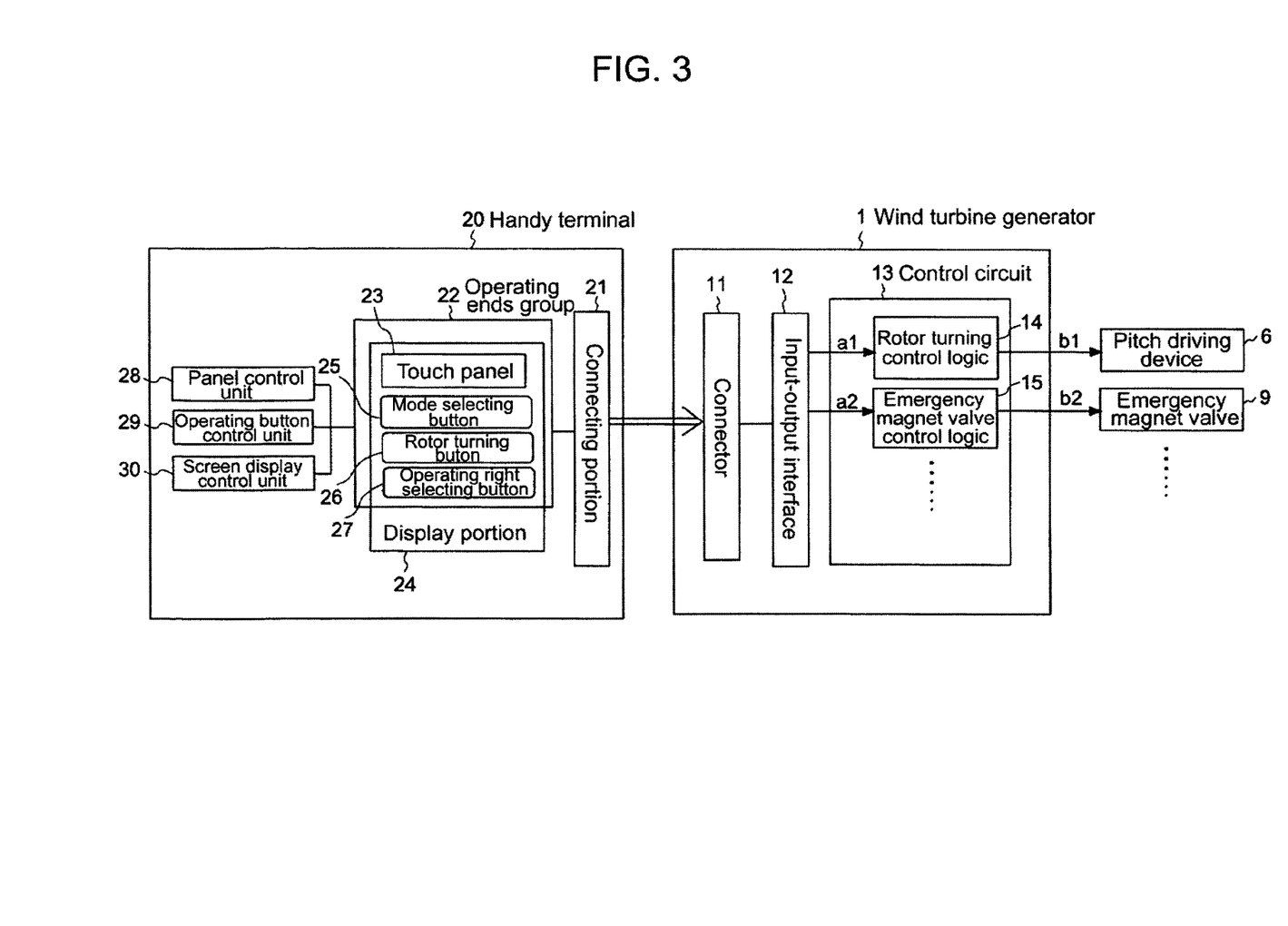
FIG. 3 is a block diagram showing a handy terminal and the wind turbine generator related to the embodiment.

FIG. 3 is a block diagram showing a handy terminal and the wind turbine generator related to the embodiment.

Each of the connector 11 of the wind turbine generator 1 and a connecting portion 21 of the handy terminal 20 is the standardized specification among the plurality of the wind turbine generator 1 so that the handy terminal 20 is connectable to any of the wind turbine generators 1.

The connecting portion 21 of the handy terminal 20 may be connected directly to the connector 11 of the wind turbine generator 1, or may be connected through a transmission cable to the connector 11 of the wind turbine generator 1. The data is transmitted from the handy terminal 20 to the wind turbine generator 1 by such connecting manner, and thereby the amount of the data transmitting is increased. Thus, the operating signals of the plurality of the control logics can be transmitted in a short time.

The wind turbine generator 1 will be described.

The wind turbine generator 1 mainly includes the connector 11, an input-output interface 12, and the control circuit 13 having the control logics 14, 15.

The control circuit 13 receives the operating signals input from the handy terminal 20 through the connector 11 or signals detected by various sensors, performs various processes to generate control signals, and sends these control signals to various devices.

The control circuit is composed of a hardware including CPU, ROM, RAM and memory, etc. Preferably, each function of the control logics 14, 15 is achieved by these hardware. This embodiment shows an example in which each of the control logics 14, 15 is achieved by software, however, each of the control logics can be constituted by hardware logic (logic circuit).

The input-output interface 12 receives signals from the handy terminal 20, various sensors, and various devices, etc., transfers the signals to each control circuit 13, and transmits the control signals generated by the control circuit 13 to various devices. It should be noted that the input-output interface 12 can be defined as including the connector 11.

In the control logics 14, 15, an operating condition is set based on the operating signals a1, a2, whereby the control logics 14, 15 process under this condition to generate control signals b1, b2.

Operating signals a1, a2 include a selecting signal for selectively validate the control logic or a numeric signal for setting a condition of the control logic. These operating signals a1, a2 are input to the control circuit 13 so that valid/invalid of the control logic is set or numeric condition is input to the control logic, and thereby the control signals B1, B2 are generated by the control logic under the operating condition.

In the embodiment, the control logic includes at least a rotor turning control logic 14 for controlling the pitch driving device 6. The rotor turning control logic 14 is for controlling the blades 5 of the wind turbine generator 1 in a blades pitch control state (herein after referred to "rotor turning state") in which the blades is rotated in a predetermined low speed with adjusting the pitch angle of the blades according to the rotational speed.

Figure 8:
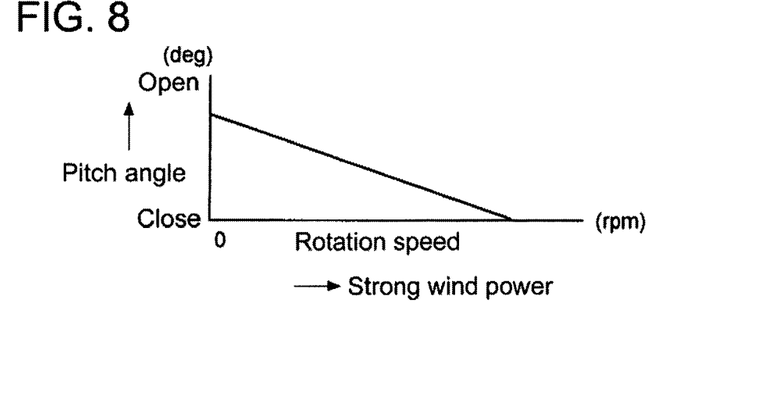
FIG. 8 is a graphic diagram showing a relationship between the rotational speed and the pitch angle.

The rotor turning state is, for example, performed as the following.

As shown in FIG. 8, the pitch angle of the blades has correlation with the rotational speed. Thus, the rotor turning control logic 14 detects the rotational speed of the blades (or the rotational shaft or the rotor head connected to the rotational shaft), and calculates the deviation between the detected value and the target value of the rotational speed, and performs the PI control based on the deviation so that the rotational speed stabilizes at the target value with adjusting the pitch angle, while driving the wind turbine generator in low speed.

Preferably, the control logic includes emergency magnet valve control logic 15 for controlling an emergency magnet valve 9.

In general, the wind turbine generator 1 includes a main oil pressure line for driving main devices of the wind turbine generator by the oil pressure, such as a blades pitch, a main shaft brake and a yaw brake, etc., and a magnet valve provided in the main oil pressure line controls the supply/exhaust of the oil pressure to the devices. Moreover, the emergency magnet valve 9 is provided in an emergency line connected to the main oil pressure line. The operating oil is conducted to the main oil pressure line by energizing (closing) the emergency magnet valve so that the devices are controlled to drive. On the other hand, the operating oil is exhausted from the main oil pressure line by non-energizing (opening) the emergency magnet valve so that the wind turbine generator 1 is stopped.

The control circuit 13 may include a plurality of control logics as described above. In the plurality of the wind turbine generator 1 provided in the same site, each of the wind turbine generators preferably includes such combination of control logics as being common among the wind turbine generators 1. Thus, the control circuit 13 includes such common logic which is applicable to the other wind turbine generator 1 in the same site, thereby being possible to standardize the construction of the control circuit 13, and therefore the cost reduction can be achieved.

The construction of handy terminal 20 will be described.

The handy terminal 20 mainly includes the connecting portion 21, an operating ends group 22 and a display portion 24. The handy terminal 20 may further include a panel control unit 28, an operating button control unit 29 and a screen display control unit 30.

The handy terminal 20 selectively switches a drive operating mode and a maintenance mode so as to perform a predetermined control corresponding to each switched mode.

The display portion 24 displays the operating state of the operating ends, and a liquid crystal display is used as the display portion.

The operating ends group 22 generates an operating signal for selectively validating the control logic within the control circuit 13 installed in the wind turbine generator 1. The operating ends group 22 may be composed of a key board provided separately from the display portion 24. Preferably, the operating ends group 22 is composed of a touch panel 23 operable by touching on the screen surface of the display portion 24. It is possible to adopt the common method (for example, a resistive layer method) as the operating method for the touch panel 23.

The operating ends group 22 includes a mode selecting button 25 for selectively validating one of a maintenance mode and an operating mode; and a rotor turning button 26 for switching the blades of the wind turbine generator 1 to the rotor turning state when the maintenance mode is selected by the mode selecting button 25, and an operating right selecting button 27 for selecting one of the control circuits 13 to be granted an operating right.

Thus, the operating ends group 22 of the handy terminal 20 includes the rotor turning button 26, and thereby the blades 5 (or the rotational shaft) can be operated to rotate in the predetermined low speed by the handy terminal 20. Thus, the efficiency of the maintenance work for the wind turbine generator 1 can be improved.

The panel control unit 28, which is provided in case that the operating ends are composed of the touch panel 23, displays the aimed operating button, and generates an operating signal when detecting pressure to the operating button on the touch panel 23. Thus, the panel control unit 28 displays the aimed operating button on the touch panel 23, and thereby the display for selecting button and the operating switch are displayed in the same screen so as to enable the visually easy operation. Preferably, the rotor turning button 26 is displayed on the display portion 24 by the panel control unit 28 when the maintenance mode is selected, and thereby the wind turbine generator 1 is prohibited to be switched to the rotor turning state when the maintenance mode is not selected. Thus, the safety in the maintenance can be improved.

The operating button control unit 29 mainly controls display on the display portion 24 of the operating buttons of the operating ends group 22 or validity/invalidity of operation of the operating buttons. The operating button control unit 29 enables the operating buttons to be displayed on the display portion 24 according to a kind of the work or enables validity/invalidity of operation of the operating buttons to be controlled, and therefore the operational performance of the handy terminal can be improved. Particularly, in case that one wind turbine generator 1 includes a plurality of the control circuits 13A, 13B, the operating button control unit 29 controls displaying on the display portion 24 or validity/invalidity of operation of the operating buttons according to the necessity, thereby it is possible to prevent the unstable performance of the control for the maintenance work caused by the mixed operating signals sent from two control circuits or the deterioration of the safety of the maintenance work.

In case that a plurality of the control circuits 13 exist, the operating button control unit 29 preferably includes a function to grant one of the control circuits 13 an operating right. The operating right is for setting validity/invalidity of the operation input from the operating button. The operating button control unit 29 accepts the operation from the handy terminal 20 which is granted the operating right, while rejecting the operation from the handy terminal 20 which is not granted the operating right. Instead, it is possible to set, in advance, the operating button on which the restriction for validity/invalidity of the operation is placed, however in particular, the ON operation of the rotor turning button 26 has to abide by the operating right.

Thus, the ON operation of the rotor turning button 26 is validated only in the control circuit 13 of which the operating right is selected, and is invalidated in the control circuit 13 of which the operating right is not selected, and therefore the safety of the maintenance work can be improved more securely.

Preferably, the operating button control unit 29 does not permit operation of any button other than the rotor turning button 26 after the rotor turning button 26 is turned ON, and thereby the other operations are prohibited to be performed during controlling of the rotor turning so that the safety of the maintenance work can be improved.

Figure 4:
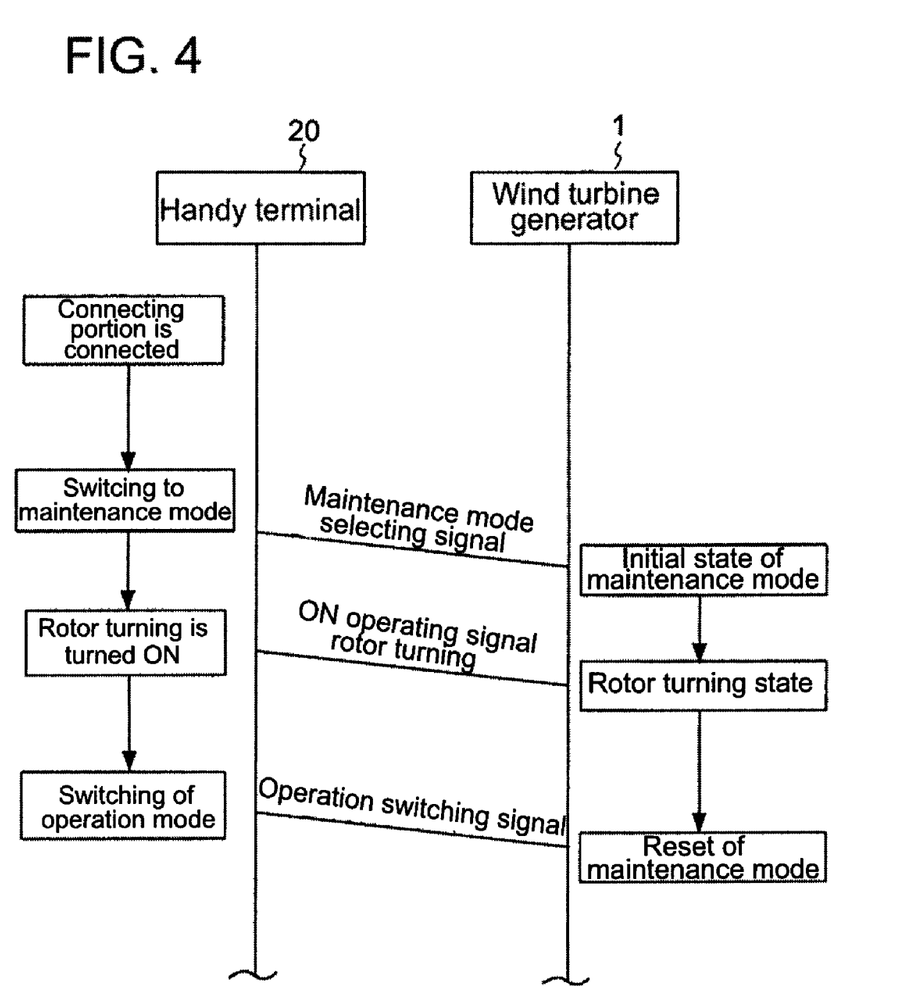
FIG. 4 is a sequence diagram showing processes of the handy terminal and the wind turbine generator.

Next, referring to FIG. 4, the sequence of the wind turbine generator 1 and the handy terminal 20 will be described.

If the connecting portion 21 of the handy terminal 20 is connected to the connector 11 of the wind turbine generator 1 and the maintenance mode is selected, the handy terminal 20 is switched to the maintenance mode.

The wind turbine generator 1 sets the maintenance mode when receiving the maintenance mode selecting signal from the handy terminal 20. In the maintenance mode, at least the wind turbine generator 1 is switched to the maintenance control mode in which at least the blades 5 are in the feathering state (rotation stopped).

Further, if the rotor turning button 26 of the handy terminal 20 is turned ON and the control circuit 13 receives the ON operating signal of the rotor turning button 26, the blades 5 are controlled to be in the rotor turning state. The maintenance work such as the greasing is performed preferably when the blades 5 are kept in the rotor turning state.

Thus, the control circuit 13 includes the control logic to switch the maintenance mode control in which the blades 5 are placed in the feathering state and the rotor turning state in which the blades 5 is placed in the rotor turning state, and switches the these control modes based on the operating signal from the handy terminal 20, therefore enabling to easily switch the state of the blades 5 using the handy terminal 20 according to the maintenance work so that the efficiency of the work can be improved.

If the maintenance work is completed and the operation switching signal to the operation control mode is input by the mode selecting button 25 of the handy terminal 20, then the control circuit 13 resets the maintenance mode according to the operation switching signal.

Preferably, the control circuit 13 keeps only the yaw control state of the nacelle and resets the other maintenance control mode when receiving an operation switching signal from the handy terminal 20 or an external remote control terminal (for example, the management device 56 or the remote monitoring device 57, etc., shown in FIG. 1) in the maintenance mode. Thus, the control circuit 13 resets the maintenance mode when receiving such operation switching signal, and thereby enabling the wind turbine generator 1 to be driven normally.

Figure 5:
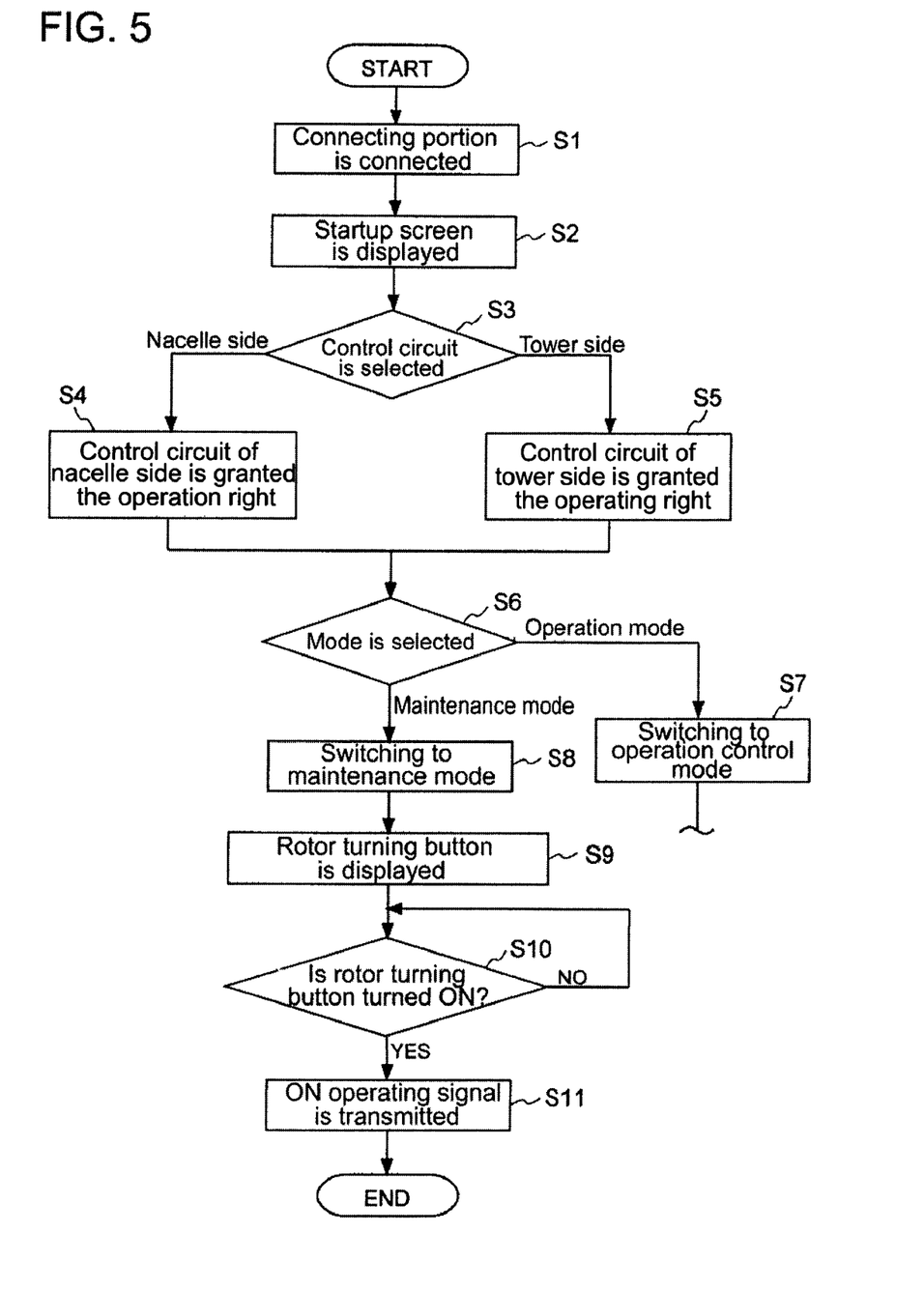
FIG. 5 is a flowchart showing a function of the handy terminal.
Figure 6:
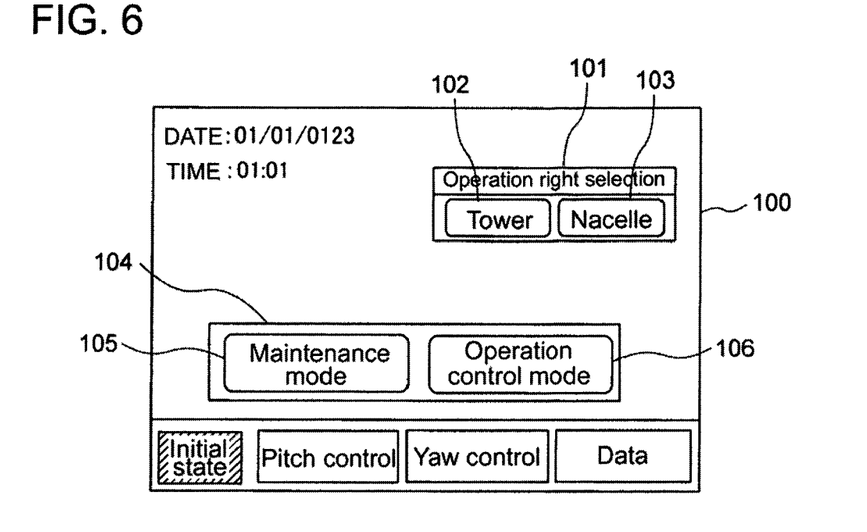
FIG. 6 is a diagram showing an example of the startup screen.
Figure 7:
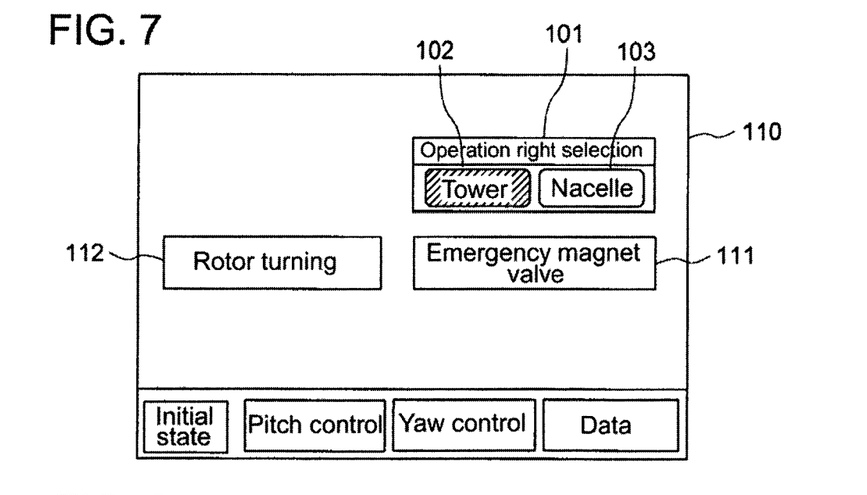
FIG. 7 is a diagram showing an example of the rotor turning setting screen.

Referring to FIGS. 5 to 7, the specific operation of the handy terminal 20 will be described. FIG. 5 is a flowchart showing a function of the handy terminal. FIG. 6 is a diagram showing an example of the startup screen. FIG. 7 is a diagram showing an example of the rotor turning setting screen.

It should be noted that the flowchart is, as an example, directed to the wind turbine generator 1 including the tower side control circuit 13A provided in the lower part of the tower and the nacelle side control circuit 13B accommodated in the nacelle.

First, the connection portion 21 of the handy terminal 20 is connected to the connector 11 of the wind turbine generator 1 (S1), then, a startup screen is displayed after an electric source of the handy terminal 20 is ON (S2). One example of the startup screen is shown in FIG. 6. An operation right selecting button 101 for setting the operation right and a mode selecting button 104 for selecting one of the maintenance mode and operation control mode are displayed on the startup screen 100

The operation right selecting button 101 includes a tower button (a tower side control circuit button) 102 and a nacelle button (a nacelle side control circuit button) 103, and the operator pushes the button for the side connected with the handy terminal 20 to select the control circuit 13 (S3).

If the nacelle button 103 is pushed, the control circuit 13B of the nacelle side is granted the operation right so that the operating signal from the handy terminal 20 connected to the control circuit 13B of the nacelle side is accepted (S4). At this point, the operating signal (in particular, an ON operating signal of the rotor turning) from the handy terminal 20 connected to the control circuit 13A of the tower side is not accepted.

On the other hand, if the tower button 102 is pushed, the control circuit 13A of the tower side is granted the operation right, the operating signal from the handy terminal 20 connected to the control circuit 13A of the tower side is accepted (S5). At this point, the operating signal (in particular, an ON operating signal of the rotor turning) from the handy terminal 20 connected to the control circuit 13B of the nacelle side is not accepted.

The following steps are operation of the handy terminal 20 for the control circuit 13 in the selected side.

If the operation right for the control circuit 13 is selected, then the operator selects the mode by the mode selecting button 104 (S6). The mode selecting button 104 includes a maintenance mode button 105 and an operation control button 106. If the operation control button 106 is pushed, the wind turbine generator 1 is switched to the operation control mode (S7). If the maintenance mode button 105 is selected, the wind turbine generator 1 is switched to the operation control mode (S8). The explanations for the processes of the operation control mode are omitted.

If the wind turbine generator 1 is switched to the maintenance mode, a rotor turning setting screen is displayed. One example of the rotor turning setting screen is shown in FIG. 7. An emergency magnet valve button 111 and a rotor turning button 112 are displayed on the rotor turning setting screen (S9).

In case that the emergency magnet valve 9 is set to close in order to prohibit the various devices from activating as the safety measures in the maintenance mode, the emergency magnet valve button 111 is pushed to close the magnet valve 9 in advance.

Then, if the rotor turning button 112 is pushed (S10), the ON operating signal of the rotor turning is transmitted to the control circuit 13 (S11).

The control circuit 13 controls the pitch activating device 6 based on the rotor turning control logic so as to perform an automatic rotor turning on receiving the ON signal of the rotor turning.

As mentioned above, the blades of the wind turbine generator 1 are switched to the rotor turning state based on the ON operating signal of the rotor turning input from the operating ends group 22 such as the touch panel in the maintenance mode, and therefore the efficiency of the maintenance work such as greasing can be improved.

The invention claimed is:

1. A handy terminal for a wind turbine generator, comprising:
   a connecting portion adapted to be connected to a connector provided in the wind turbine generator,
   an operating ends group including an operating end to generate an operating signal which selectively validates a control logic within a control circuit provided in the wind turbine generator, and
   a display portion for displaying an operating state of the operating ends group,
   wherein
   the operating ends group includes a mode selecting button for selectively validating one of a maintenance mode and an operating mode,
   a rotor turning button for switching to a blades pitch control state which defines a rotor turning state, and
   in the rotor turning state, blades of the wind turbine generator side are driven in a predetermined low speed which is lower than a rotational speed in the operating mode with adjusting the pitch angle of the blades according to the rotational speed.

2. A handy terminal for a wind turbine generator according to claim 1, wherein
   the operating ends group is composed of a touch panel displayed on the display portion,
   the handy terminal includes a panel control unit for displaying an aimed operating button on the touch panel, and
   the rotor turning button is displayed on the touch panel by the panel control unit when the maintenance mode is selected by the mode selecting button.

3. A handy terminal for a wind turbine generator according to claim 2, wherein the wind turbine generator includes
   a nacelle supported on the a tower provided to stand on the ground or on the water, and
   a plurality of blades rotatably supported to the nacelle,
   wherein the connecting portion is connectable to the connectors respectively provided on the lower portion of the tower and the nacelle, and
   wherein the handy terminal comprises an operating button control unit for controlling the display of the operating button for generating the operating signal on the touch panel or controlling validity/invalidity of operation by the operating button.

4. A handy terminal for a wind turbine generator according to claim 3, wherein the operating button control unit displays an operating right selecting button for selecting one of a control circuit connected to the connector of the nacelle side and a circuit connected to the connector of the tower side, and
   wherein the ON operation of the rotor turning button is validated when the connecting portion of the handy terminal is connected to the control circuit granted the operating right by the operation of the operating right selecting button, and the ON operation of the rotor turning button is invalidated when the connecting portion of the handy terminal is connected to the control circuit not granted the operating right by the operation of the operating right selecting button.

5. A handy terminal for a wind turbine generator according to claim 3, wherein the operating button control unit does not permit operation of any button other than the rotor turning button after the rotor turning button is turned ON.

6. A wind turbine generator including a nacelle supported on a tower provided to stand on the ground or on the water, and a plurality of blades rotatably supported to the nacelle, comprising:
   a connector provided on the nacelle or the lower portion of the tower and connectable to the handy terminal as set forth in claim 1;
   a control circuit for switching to a maintenance mode to place the blades in a feathering state where the rotation is stopped when receiving the maintenance mode selecting signal from the mode selecting button of the handy terminal, and switching to the rotor turning state for rotor turning the blades based on the ON operating signal of the rotor turning button in the state of the maintenance mode.

7. A wind turbine generator according to claim 6, wherein the control circuit validates the ON operating signal of the rotor turning button, when the connecting portion is connected to the connector provided in the nacelle side.

8. A wind turbine generator according to claim 6, wherein the control circuit does not permit operation of any button other than the rotor turning button after validating the ON operating signal of the rotor turning button.

9. A wind turbine generator according to claim 6, wherein the control circuit keeps only a yaw control state of the nacelle and resets the other maintenance control mode when receiving an operation signal for switching to the maintenance mode from the handy terminal or an external remote control terminal.

* * * * *